US012639234B2

(12) United States Patent
    Wang et al.

(10) Patent No.: US 12,639,234 B2
(45) Date of Patent: May 26, 2026

(54) PROCESSOR AND METHOD FOR MEMORY ACCESS INSTRUCTION, AND ELECTRONIC DEVICE

(71) Applicant: BEIJING ESWIN COMPUTING TECHNOLOGY CO., LTD., Beijing City (CN)

(72) Inventors: Xiaogeng Wang, Beijing City (CN); Yongbin Yao, Beijing City (CN)

(73) Assignee: BEIJING ESWIN COMPUTING TECHNOLOGY CO., LTD., Beijing City (CN)

( * ) Notice: Subject to any disclaimer, the term of this patent is extended or adjusted under 35 U.S.C. 154(b) by 0 days.

(21) Appl. No.: 18/965,888

(22) Filed: Dec. 2, 2024

(65) Prior Publication Data

US 2025/0291740 A1     Sep. 18, 2025

(30) Foreign Application Priority Data

Mar. 14, 2024    (CN) .......................... 202410295200.8

(51) Int. Cl.
    *G06F 12/14*        (2006.01)
    *G06F 12/02*        (2006.01)
    *G06F 13/16*        (2006.01)
(52) U.S. Cl.
    CPC ...... *G06F 12/1441* (2013.01); *G06F 12/0246* (2013.01); *G06F 13/1689* (2013.01)

(58) Field of Classification Search
    CPC ............. G06F 12/1441; G06F 13/1689; G06F 12/0246
    See application file for complete search history.

(56) References Cited

U.S. PATENT DOCUMENTS 11,586,910 B1 *   2/2023   Duong ..................... G06N 3/08

* cited by examiner

*Primary Examiner* — Jae U Yu
(74) *Attorney, Agent, or Firm* — Mendelsohn Dunleavy PC; Kevin J. Dunleavy

(57)                    ABSTRACT

The present application provides a processor and a method for memory access instruction, and an electronic device, and relates to the field of computer technology. The method includes: the memory access unit generates the target physical memory address corresponding to the memory access instruction in case of receiving the memory access instruction, and transmits the target physical memory address to the cache unit and the programmable physical memory property detection unit respectively in the current clock cycle; the programmable physical memory property detection unit determines the detection result for the cache property of the target physical memory address in the current clock cycle; the cache unit performs the memory access operation at the target physical memory address based on the detection result for the cache property in the next clock cycle subsequent to the current clock cycle. This may reduce the logical depth of the critical memory access paths and improve the clock speed of the processor.

7 Claims, 3 Drawing Sheets

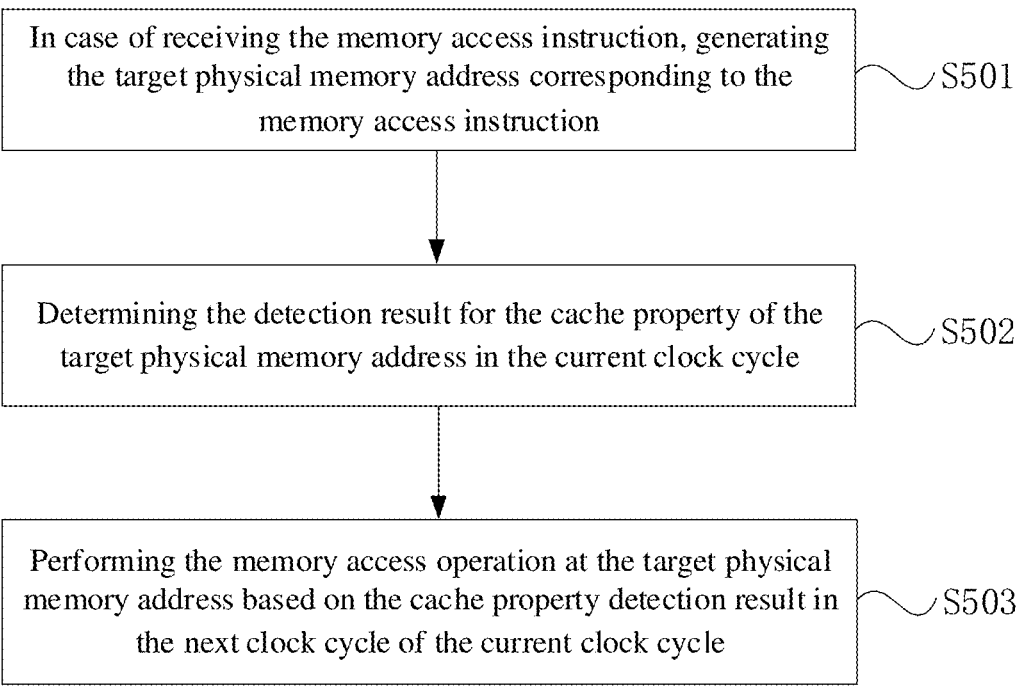

In case of receiving the memory access instruction, generating the target physical memory address corresponding to the memory access instruction

~S501

Determining the detection result for the cache property of the target physical memory address in the current clock cycle

~S502

Performing the memory access operation at the target physical memory address based on the cache property detection result in the next clock cycle of the current clock cycle

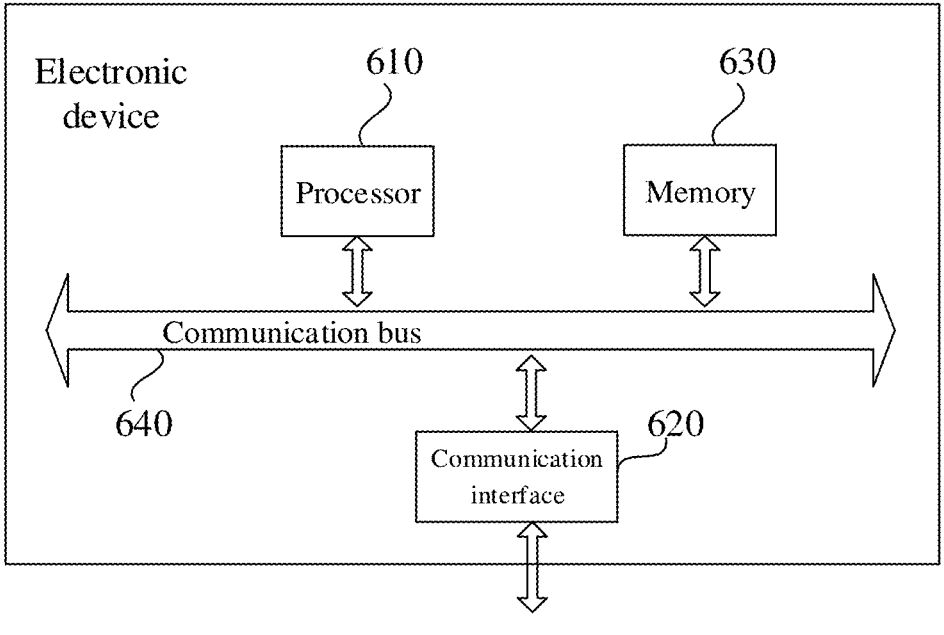

Electronic device

610

630

Processor

Memory

Communication bus

640

620

Communication interface

PROCESSOR AND METHOD FOR MEMORY ACCESS INSTRUCTION, AND ELECTRONIC DEVICE

CROSS-REFERENCE TO RELATED APPLICATIONS

This application claims priority to Chinese Patent application no.: 2024102952008 filed on Mar. 14, 2024, the entire disclosure of which is hereby incorporated by reference in its entirety as if fully set forth herein.

FIELD

The present application relates to the field of computer technology, and particularly to a processor and a method for memory access instruction, and an electronic device.

BACKGROUND

In processors, the cache properties of physical memory addresses are usually fixed. The cache properties of physical memory addresses include cacheable or non-cacheable.

In some scenarios, to dynamically program the cache properties of physical memory addresses, it is necessary to detect the cache property of each physical memory address and determine whether to access the cache or bypass the cache to directly access a main memory based on detection results for the cache properties.

However, the above method will result in poor clock speed of the processor.

BRIEF SUMMARY

The present application provides a processor and a method for memory access instruction, and an electronic device, which may improve the clock speed of the processor.

The present application provides a processor for memory access instruction, including a memory access unit, a cache unit, and a programmable physical memory property detection unit, where the memory access unit is used for generating, in case of receiving a memory access instruction, a target physical memory address corresponding to the memory access instruction, and transmitting the target physical memory address to the cache unit and the programmable physical memory property detection unit respectively in a current clock cycle;

the programmable physical memory property detection unit is used for determining a detection result for a cache property of the target physical memory address in the current clock cycle; and the cache unit is used for performing a memory access operation at the target physical memory address based on the detection result for the cache property in a next clock cycle subsequent to the current clock cycle.

According to the processor for memory access instruction provided by the present application, the processor further includes a register, where the register is used for sampling the detection result for the cache property to obtain a detection signal for the cache property in the current clock cycle, and transmitting the detection signal for the cache property to the cache unit in the next clock cycle; and performing the memory access operation at the target physical memory address based on the detection result for the cache property in the next clock cycle subsequent to the current clock cycle includes:

performing the memory access operation at the target physical memory address based on the detection signal for the cache property in the next clock cycle.

According to the processor for memory access instruction provided by the present application, performing the memory access operation at the target physical memory address based on the detection signal for the cache property includes:

in case that the detection signal for the cache property is a low-level signal, performing the memory access operation at the target physical memory address based on a read tag index.

According to the processor for memory access instruction provided by the present application, the performing the memory access operation at the target physical memory address based on the detection signal for the cache property includes:

in case that the detection signal for the cache property is a low-level signal, transmitting the target physical memory address to a main memory unit, where the main memory unit is used for performing the memory access operation at the target physical memory address.

According to the processor for memory access instruction provided by the present application, the processor further includes a gate control unit, where the gate control unit is used for receiving a verification indication signal transmitted from the memory access unit and an activation indication signal transmitted from the cache unit, and in case that both the verification indication signal and the activation indication signal are high-level signals, transmitting the detection result for the cache property to the register.

The present application further provides a method for memory access instruction, performed by the processor for memory access instruction described above, and the method includes:

generating, in case of receiving the memory access instruction, the target physical memory address corresponding to the memory access instruction;

determining the detection result for the cache property of the target physical memory address in the current clock cycle; and performing the memory access operation at the target physical memory address based on the detection result for the cache property in the next clock cycle subsequent to the current clock cycle.

According to the method for memory access instruction provided by the present application, the method further includes:

sampling the detection result for the cache property to obtain a detection signal for the cache property in the current clock cycle; and performing the memory access operation at the target physical memory address based on the detection result for the cache property in the next clock cycle subsequent to the current clock cycle includes:

performing the memory access operation at the target physical memory address based on the detection signal for the cache property in the next clock cycle.

According to the method for memory access instruction provided by the present application, performing the memory access operation at the target physical memory address based on the detection signal for the cache property includes:

in case that the detection signal for the cache property is a low-level signal, performing the memory access operation at the target physical memory address based on a read tag index.

According to the method for memory access instruction provided by the present application, performing the memory access operation at the target physical memory address based on the detection signal for the cache property includes:

in case that the detection signal for the cache property is a low-level signal, transmitting the target physical memory address to a main memory unit, where the main memory unit is used for performing the memory access operation at the target physical memory address.

According to the method for memory access instruction provided by the present application, sampling the detection result for the cache property in the current clock cycle includes:

detecting whether both the verification indication signal and the activation indication signal are high-level signals; and sampling the detection result for the cache property in the current clock cycle in case that both the verification indication signal and the activation indication signal are high-level signals.

The present application further provides an electronic device, including a memory, a processor, and a computer program stored in the memory and executable in the processor, and the processor implements the method for memory access instruction as described above when executing the program.

The present application further provides a non-transitory computer-readable storage medium storing a computer program, where the computer program, when executed by a processor, implements the method for memory access instruction as described above.

The present application further provides a computer product storing a computer program, where the computer program, when executed by a processor, implements the method for memory access instruction as described above.

In the processor and method for memory access instruction, and the electronic device provided by the present application, the memory access unit generates the target physical memory address corresponding to the memory access instruction in case of receiving the memory access instruction, and transmits the target physical memory address to the cache unit and the programmable physical memory property detection unit respectively in the current clock cycle; the programmable physical memory property detection unit determines the detection result for the cache property of the target physical memory address in the current clock cycle; the cache unit performs the memory access operation at the target physical memory address based on the detection result for the cache property in the next clock cycle subsequent to the current clock cycle. This may reduce logical depth of the critical memory access paths and improve the clock speed of the processor.

BRIEF DESCRIPTION OF THE DRAWINGS

To illustrate the solutions in the embodiments of the present application or in the related art more clearly, the drawings used in the description of the embodiments or the related art are briefly described below. The drawings in the following description are only some embodiments of the present application, and other drawings may be obtained according to these drawings without any creative work for those skilled in the art.

FIG. 5 is a flowchart of a method for memory access instruction according to an embodiment of the present application; and FIG. 6 is a schematic structural diagram of an electronic device according to an embodiment of the present application.

DETAILED DESCRIPTION

To illustrate the objectives, solutions and advantages of the application, the solutions in present the application will be described clearly and completely below in combination with the drawings in the application. Embodiments described are part of the embodiments of the application, not all of them. All other embodiments obtained by those skilled in the art based on the embodiments of the present application without any creative work belong to the scope of the present application.

In the embodiments of the present application, "at least one" refers to one or more, and "a plurality of" refers to two or more. "And/or" describes the association relationship of the associated objects, indicating that there may be three types of relationships. For example, A and/or B may represent three situations: A exists alone, A and B exist simultaneously, and B exists alone, where A and B may be singular or plural. In the textual description of the present application, the character "/" generally indicates an "or" relationship between the related objects.

The solution provided in the embodiments of the present application may be performed in the memory access scenario of physical memory addresses. It is usual to use caches to improve memory access speed. The cache properties of physical memory addresses may be used to define the cache characteristics of physical memory addresses. The cache properties of physical memory addresses include cacheable or non-cacheable.

Normally, the cache properties of physical memory addresses are fixed. In some scenarios, to dynamically program the cache properties of physical memory addresses, it is necessary to detect the cache property of each physical memory address and determine whether to access the cache or bypass the cache to directly access a main memory based on detection results for the cache properties. However, this will result in poor clock speed of the processor.

To improve the clock speed of the processor, the embodiments of the present application provide a processor for memory access instruction. The processor for memory access instruction provided by the present application will be explained in detail through the following embodiments. The following embodiments may be combined with each other, and the same or similar concepts or processes may not be repeated in some embodiments.

Figure 1:
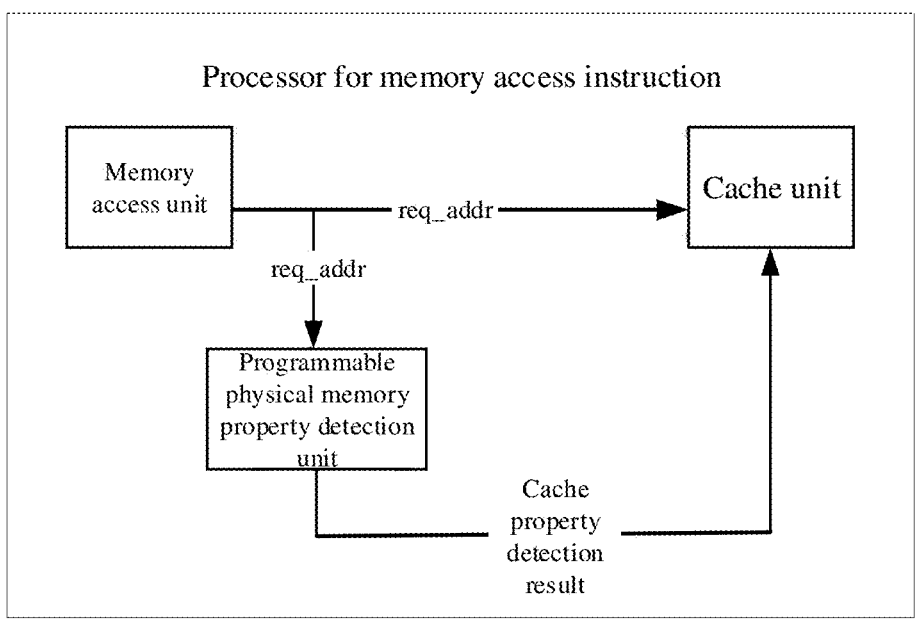
FIG. 1 is a schematic structural diagram of a processor for memory access instruction according to an embodiment of the present application.

FIG. 1 is a schematic structural diagram of a processor for memory access instruction according to an embodiment of the present application. As shown in FIG. 1, the processor for memory access instruction may include a memory access unit, a cache unit, and a programmable physical memory property detection unit.

The memory access unit is used for generating, in case of receiving a memory access instruction, a target physical memory address corresponding to the memory access instruction, and transmitting the target physical memory address to the cache unit and the programmable physical memory property detection unit respectively in a current clock cycle.

The programmable physical memory property detection unit is used for determining a detection result for a cache property of the target physical memory address in the current clock cycle.

The cache unit is used for performing a memory access operation at the target physical memory address based on the detection result for the cache property in a next clock cycle subsequent to the current clock cycle.

In an embodiment, after receiving the memory access instruction, the memory access unit may read a value of a general register and add the read value of the general register to an offset to generate the target physical memory address corresponding to the memory access instruction. In an embodiment, the target physical memory address may be referred to as req_addr.

After generating the target physical memory address corresponding to the memory access instruction, the memory access unit transmits the target physical memory address to the cache unit and the programmable physical memory property detection unit respectively in the current clock cycle. The cache unit may be referred to as cache, and the cache unit may read the tag index normally in the current clock cycle. The programmable physical memory property detection unit determines the detection result for the cache property of the target physical memory address normally in the current clock cycle. In the embodiments of the present application, if the memory access operation is directly performed at the target physical memory address based on the detection result for the cache property in the current clock cycle, it will increase the logical depth of the critical memory access paths, resulting in poor clock speed of the processor. Therefore, although the programmable physical memory property detection unit may determine the detection result for the cache property of the target physical memory address in the current clock cycle, the cache unit performs the memory access operation at the target physical memory address based on the detection result for the cache property in the next clock cycle subsequent to the current clock cycle, which may reduce the logical depth of the critical memory access paths and improve the clock speed of the processor.

It may be seen that, in the embodiments of the present application, the memory access unit generates the target physical memory address corresponding to the memory access instruction in case of receiving the memory access instruction, and transmits the target physical memory address to the cache unit and the programmable physical memory property detection unit respectively in the current clock cycle; the programmable physical memory property detection unit determines the detection result for the cache property of the target physical memory address in the current clock cycle; the cache unit performs the memory access operation at the target physical memory address based on the detection result for the cache property in the next clock cycle subsequent to the current clock cycle. This may reduce the logical depth of the critical memory access paths and improve the clock speed of the processor.

Figure 2:
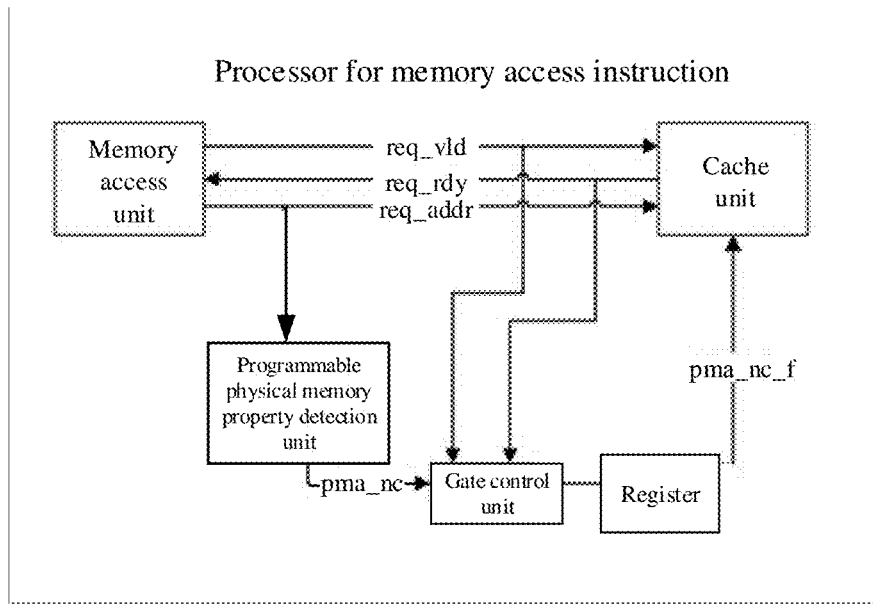
FIG. 2 is a schematic structural diagram of another processor for memory access instruction according to an embodiment of the present application.

Based on the embodiment shown in FIG. 1 above, in the embodiments of the present application, the processor for memory access instruction further includes a gate control unit and a register. For example, FIG. 2 is a schematic structural diagram of another processor for memory access instruction according to an embodiment of the present application, the processor for memory access instruction may include:

a gate control unit, used for receiving a verification indication signal transmitted from the memory access unit and an activation indication signal transmitted from the cache unit, and in case that both the verification indication signal and the activation indication signal are high-level signals, transmitting the detection result for the cache property to the register.

In an embodiment, the verification indication signal may be referred to as req_vld, and the activation indication signal may be referred to as req_rdy.

After determining the detection result for the cache property of the target physical memory address in the current clock cycle, the programmable physical memory property detection unit does not directly transmit the detection result for the cache property to the register. Instead, the programmable physical memory property detection unit detects whether both the verification indication signal and activation indication signal are high-level signals. If both the verification indication signal and activation indication signal are high-level signals, it indicates that a request handshake is completed. Then, the detection result for the cache property is transmitted to the register, and the register may sample the detection result for the cache property and transmit the detection signal for the cache property to the cache in the next clock cycle.

In an embodiment, after receiving the detection result for the cache property transmitted from the gate control unit, the register may perform:

sampling the detection result for the cache property to obtain a detection signal for the cache property in the current clock cycle, and transmitting the detection signal for the cache property to the cache unit in the next clock cycle.

In an embodiment, performing a memory access operation at the target physical memory address based on the detection result for the cache property in a next clock cycle subsequent to the current clock cycle includes:

performing the memory access operation at the target physical memory address based on the detection signal for the cache property in the next clock cycle.

In an embodiment, the programmable physical memory property detection unit determines the detection result for the cache property of the target physical memory address in the current clock cycle. For example, the detection result for the cache property may be referred to as pma_nc. When pma_nc=1, it means that the detection result for the cache property is non-cacheable; when pma_nc=0, it means that the detection result for the cache property is cacheable.

The register will further sample the detection result for the cache property pma_nc during the current clock cycle to obtain the detection signal for the cache property. In an embodiment, the detection signal for the cache property may be referred to as pma_nc_f, which is valid data only in the next clock cycle after the request handshake is completed. When pma_nc_f is a high-level signal, it means that the detection result for the cache property is non-cacheable;

when pma_nc_f is a low-level signal, it means that the detection result for the cache property is cacheable.

In the embodiments of the present application, if the memory access operation is directly performed at the target physical memory address based on the detection result for the cache property pma_nc in the current clock cycle, it will increase the logical depth of the critical memory access paths, resulting in poor clock speed of the processor. Therefore, although the register will also sample the detection result for the cache property pma_nc to obtain the detection signal for the cache property pma_nc_f in the current clock cycle, the detection signal for the cache property pma_nc_f is transmitted to the cache unit in the next clock cycle, and the cache unit further performs the memory access operation at the target physical memory address based on the detection signal for the cache property pma_nc_f in the next clock cycle. This may reduce the logical depth of the critical memory access paths and improve the clock speed of the processor.

In an embodiment, performing the memory access operation at the target physical memory address based on the detection signal for the cache property pma_nc_f may include at least two possible implementation methods as follows.

In one implementation, when the detection signal for the cache property pma_nc_f is a low-level signal, it indicates that the detection result for the cache property is cacheable. In this case, the memory access operation is performed at the target physical memory address based on the read tag index.

Figure 3:
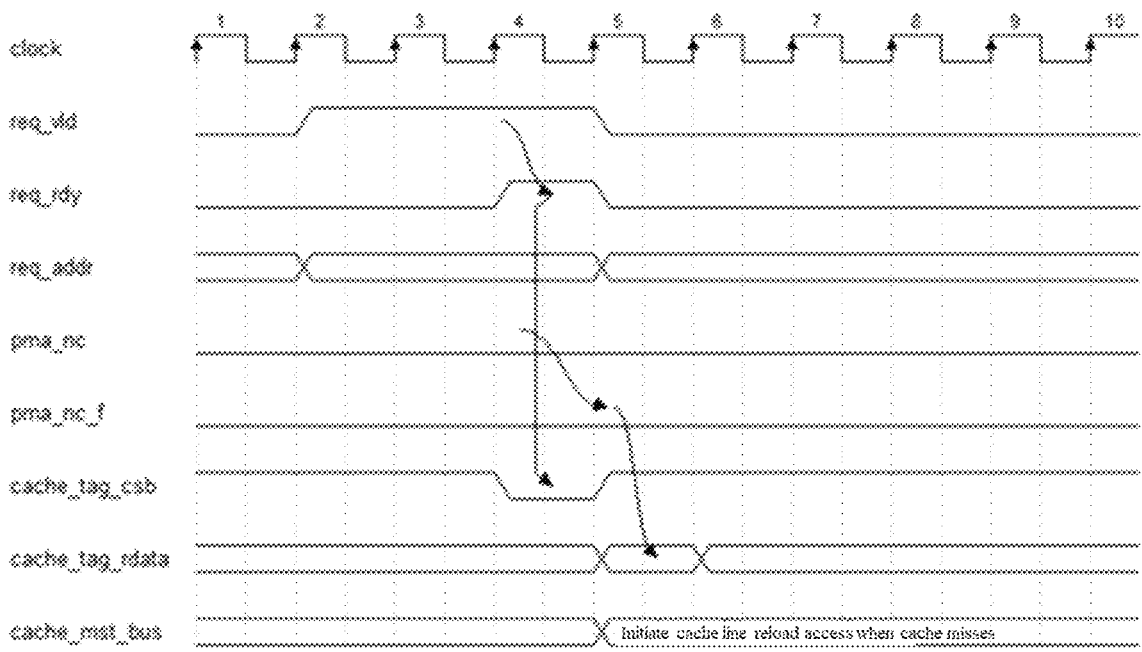
FIG. 3 is a timing diagram of memory access instruction processing according to an embodiment of the present application.

For example, as shown in FIG. 3, a timing diagram of processing of memory access instruction according to an embodiment of the present application, it is assumed that the target physical memory address is detected by the programmable physical memory property detection unit to obtain the detection result for the cache property pma_nc. The current clock cycle is assumed to be the fourth tick. After completing the request handshake, the register will sample the detection result for the cache property pma_nc to obtain the detection signal for the cache property pma_nc_f, and transmit the detection signal for the cache property pma_nc_f to the cache unit in the fifth tick. If the detection signal for the cache property pma_nc_f is a low-level signal, it indicates that the detection result for the cache property is cacheable, the memory access operation may be directly performed at the target physical memory address based on the read tag index, and then the remaining cache access actions are completed. In this way, even if detection for the cache property of the target physical memory address is added, it will not affect the back-to-back access to the cache and the latency of the original cacheable access, and the cache performance is not affected.

In another implementation, when the detection signal for the cache property is a low-level signal, the target physical memory address is transmitted to the main memory unit and the main memory unit is used for performing the memory access operation at the target physical memory address.

Figure 4:
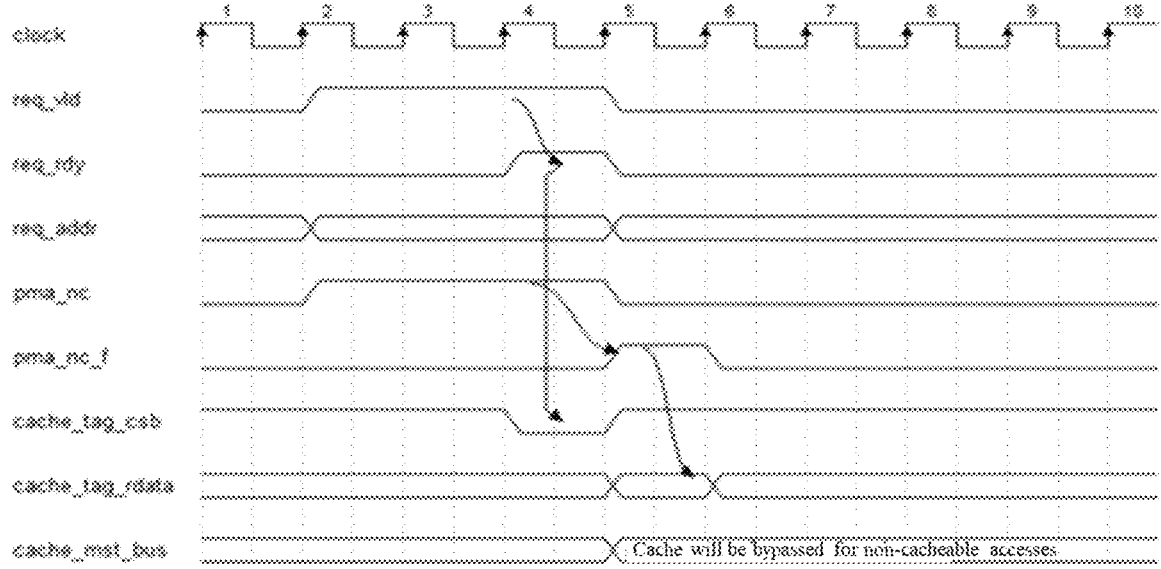
FIG. 4 is a timing diagram of another memory access instruction processing according to an embodiment of the present application.

For example, as shown in FIG. 4, a timing diagram of another processing of memory access instruction according to an embodiment of the present application, it is assumed that the target physical memory address is detected by the programmable physical memory property detection unit, and the detection result for the cache property pma_nc is obtained. The current clock cycle is assumed to be the fourth tick. After completing the request handshake, the register will sample the detection result for the cache property pma_nc to obtain the detection signal for the cache property pma_nc_f, and transmit the detection signal for the cache property pma_nc_f to the cache unit in the fifth tick. If the detection signal for the cache property pma_nc_f is a high-level signal, it indicates that the detection result for the cache property is non-cacheable. The target physical memory address may be transmitted to the main memory unit via host interface cache_mst_bus, and the main memory unit performs the access operation based on the target physical memory address. Even if detection for the cache property of the target physical memory address is added, there is only an additional one tick delay, which may be ignored if it is not insensitive to performance. In addition, the main memory unit only reuses the access information stored in the cache, without additional register overhead, so only a small amount of combinational logic is added.

The following describes the method for memory access instruction provided by the present application. The method for memory access instruction described below may be referenced to the processor for memory access instruction described above.

FIG. 5 is a flowchart of a method for memory access instruction according to an embodiment of the present application, and the method is performed by the processor for memory access instructions described above. For example, referring to FIG. 5, the method for the memory access instruction may include:

S501: generating, in case of receiving the memory access instruction, the target physical memory address corresponding to the memory access instruction;

S502: determining the detection result for the cache property of the target physical memory address in the current clock cycle; and S503: performing the memory access operation at the target physical memory address based on the detection result for the cache property in the next clock cycle subsequent to the current clock cycle.

In an embodiment, the method further includes:

sampling the detection result for the cache property to obtain a detection signal for the cache property in the current clock cycle; and performing the memory access operation at the target physical memory address based on the detection result for the cache property in the next clock cycle subsequent to the current clock cycle includes:

performing the memory access operation at the target physical memory address based on the detection signal for the cache property in the next clock cycle.

In an embodiment, performing the memory access operation at the target physical memory address based on the detection signal for the cache property includes:

in case that the detection signal for the cache property is a low-level signal, performing the memory access operation at the target physical memory address based on a read tag index.

In an embodiment, performing the memory access operation at the target physical memory address based on the detection signal for the cache property includes:

in case that the detection signal for the cache property is a low-level signal, transmitting the target physical memory address to a main memory unit, where the main memory unit is used for performing the memory access operation at the target physical memory address.

In an embodiment, sampling the detection result for the cache property in the current clock cycle includes:

detecting whether both the verification indication signal and the activation indication signal are high-level signals; and sampling the detection result for the cache property in the current clock cycle in case that both the verification indication signal and the activation indication signal are high-level signals.

The principle and effects of the method for memory access instruction provided in this embodiment are similar to those of the processor for memory access instruction, and may be referred to the principle and effects of the processor for memory access instruction, which will not be repeated here.

FIG. 6 is a schematic structural diagram of an electronic device according to an embodiment of the present application. As shown in FIG. 6, the electronic device may include: a processor 610, a communication interface 620, a memory 630, and a communication bus 640, where the processor 610, the communication interface 620, and the memory 630 communicate with each other through the communication bus 640. The processor 610 may call logical instructions in the memory 630 to perform the method for memory access instruction described above, which includes: generating, in case of receiving the memory access instruction, the target physical memory address corresponding to the memory access instruction; determining the detection result for the cache property of the target physical memory address in the current clock cycle; and performing the memory access operation at the target physical memory address based on the detection result for the cache property in the next clock cycle subsequent to the current clock cycle.

In addition, the logic instructions in the memory 630 described above may be implemented in the form of a software functional unit and may be stored in a computer readable storage medium while being sold or used as a separate product. Based on such understanding, the solution of the present application or a part of the solution, which is essential or contributes to the prior art, may be embodied in the form of a software product, which is stored in a storage medium, including several instructions to cause a computer device (which may be a personal computer, server, or network device, etc.) to perform all or part of the steps of the methods described in various embodiments of the present application. The storage medium described above includes various media that may store program codes such as flash disk, mobile hard disk, read-only memory (ROM), random access memory (RAM), magnetic disk, or a compact disk.

The present application further provides a computer program product, the computer program product includes a computer program, the computer program may be stored on a non-transitory computer-readable storage medium. When the computer program is executed by a processor, the computer may perform the method for memory access operation described above. The method includes: generating, in case of receiving the memory access instruction, the target physical memory address corresponding to the memory access instruction; determining the detection result for the cache property of the target physical memory address in the current clock cycle; and performing the memory access operation at the target physical memory address based on the detection result for the cache property in the next clock cycle subsequent to the current clock cycle.

The present application further provides a non-transitory computer-readable storage medium, storing a computer program, and the computer program, when executed by a processor, implements the method for memory access operation described above. The method includes: generating, in case of receiving the memory access instruction, the target physical memory address corresponding to the memory access instruction; determining the detection result for the cache property of the target physical memory address in the current clock cycle; and performing the memory access operation at the target physical memory address based on the detection result for the cache property in the next clock cycle subsequent to the current clock cycle.

The device embodiments described above are merely illustrative, wherein the units described as separate components may or may not be physically separate, and the components displayed as units may or may not be physical units, that is, may be located at the same place or be distributed to multiple network units. Some or all of the modules may be selected according to actual needs to achieve the purpose of the solution of the present embodiment. Those skilled in the art may understand and implement the embodiments described above without paying creative labors.

Through the description of the embodiments above, those skilled in the art can clearly understand that the various embodiments can be implemented by means of software and a necessary general hardware platform, and of course, by hardware. Based on such understanding, the solutions of the present application in essence or a part of the solutions that contributes to the prior art, or a part of the solutions, may be embodied in the form of a software product, which may be stored in a storage medium such as ROM/RAM, magnetic discs, optical discs, etc., and includes several instructions to cause a computer device (which may be a personal computer, server, or network device, etc.) to perform the methods described in various embodiments or a part thereof.

Finally, it should be noted that the above embodiments are only used to explain the solutions of the present application, and are not limited thereto; although the present application is described in detail with reference to the foregoing embodiments, it should be understood by those skilled in the art that they can still modify the solutions described in the foregoing embodiments and make equivalent replacements to a part of the features and these modifications and substitutions do not depart from the scope of the solutions of the embodiments of the present application.

What is claimed is:

1. A processor for memory access instruction, comprising a memory access unit, a cache unit, a programmable physical memory property detection unit and a register, wherein the memory access unit is used for generating, in case of receiving a memory access instruction, a target physical memory address corresponding to the memory access instruction, and transmitting the target physical memory address to the cache unit and the programmable physical memory property detection unit respectively in a current clock cycle;

the programmable physical memory property detection unit is used for determining a detection result for a cache property of the target physical memory address in the current clock cycle; and the cache unit is used for performing a memory access operation at the target physical memory address based on the detection result for the cache property in a next clock cycle subsequent to the current clock cycle;

the register is used for sampling the detection result for the cache property to obtain a detection signal for the cache property in the current clock cycle, and transmitting the detection signal for the cache property to the cache unit in the next clock cycle; and performing the memory access operation at the target physical memory address based on the detection result for the cache property in the next clock cycle subsequent to the current clock cycle comprises:

performing the memory access operation at the target physical memory address based on the detection signal for the cache property in the next clock cycle;

the processor further comprising a gate control unit, wherein the gate control unit is used for receiving a verification indication signal transmitted from the memory access unit and an activation indication signal transmitted from the cache unit, and in case that both the verification indication signal and the activation indication signal are high-level signals, transmitting the detection result for the cache property to the register.

2. The processor of claim 1, wherein performing the memory access operation at the target physical memory address based on the detection signal for the cache property comprises:

in case that the detection signal for the cache property is a low-level signal, performing the memory access operation at the target physical memory address based on a read tag index.

3. The processor of claim 1, wherein performing the memory access operation at the target physical memory address based on the detection signal for the cache property comprises:

in case that the detection signal for the cache property is a low-level signal, transmitting the target physical memory address to a main memory unit, the main memory unit being used for performing the memory access operation at the target physical memory address.

4. A method for memory access instruction, performed by the processor for memory access instruction of claim 1, the method comprising:

generating, in case of receiving the memory access instruction, the target physical memory address corresponding to the memory access instruction;

determining the detection result for the cache property of the target physical memory address in the current clock cycle; and performing the memory access operation at the target physical memory address based on the detection result for the cache property in the next clock cycle subsequent to the current clock cycle;

sampling the detection result for the cache property to obtain a detection signal for the cache property in the current clock cycle, and transmitting the detection signal for the cache property to the cache unit in the next clock cycle; and performing the memory access operation at the target physical memory address based on the detection result for the cache property in the next clock cycle subsequent to the current clock cycle comprises:

performing the memory access operation at the target physical memory address based on the detection signal for the cache property in the next clock cycle;

the processor further comprising a gate control unit, wherein the gate control unit is used for receiving a verification indication signal transmitted from the memory access unit and an activation indication signal transmitted from the cache unit, and in case that both the verification indication signal and the activation indication signal are high-level signals, transmitting the detection result for the cache property to the register.

5. An electronic device, comprising a memory, a processor, and a computer program stored in the memory and executable in the processor, wherein the processor, when executing the computer program, performs the method for memory access instruction of claim 4.

6. A non-transitory computer-readable storage medium storing a computer program, wherein the computer program, when executed by a processor, performs the method for memory access instruction of claim 4.

7. A computer program product, comprising a computer program, wherein the computer program, when executed by a processor, performs the method for memory access instruction of claim 4.

\* \* \* \* \*